(12) United States Patent
Dariush (10) Patent No.: US 8,396,595 B2
(45) Date of Patent: Mar. 12, 2013

(54) REAL-TIME SELF COLLISION AND OBSTACLE AVOIDANCE USING WEIGHTING MATRIX

(75) Inventor: Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1118 days.

(21) Appl. No.: 12/258,184

(22) Filed: Oct. 24, 2008

(65) Prior Publication Data

US 2009/0118863 A1    May 7, 2009

Related U.S. Application Data

(60) Provisional application No. 60/984,639, filed on Nov. 1, 2007.

(51) Int. Cl.
    *G05B 19/04*      (2006.01)
    *G05B 19/18*      (2006.01)

(52) U.S. Cl. ....................................................... 700/255

(58) Field of Classification Search .................. 700/255; 382/106–107, 181, 259
See application file for complete search history.

(56) References Cited

U.S. PATENT DOCUMENTS

| | | | |
|---|---|---|---|
| 4,831,549 A | 5/1989 | Red et al. | |
| 5,159,249 A | 10/1992 | Megherbi | |
| 5,293,461 A | 3/1994 | Grudic et al. | |
| 5,430,643 A | 7/1995 | Seraji | |
| 5,550,953 A | 8/1996 | Seraji | |
| 5,586,224 A | 12/1996 | Kunii et al. | |
| 5,625,577 A | 4/1997 | Kunii et al. | |
| 5,675,720 A | 10/1997 | Sato et al. | |
| 5,737,500 A * | 4/1998 | Seraji et al. | 700/251 |
| 5,808,433 A | 9/1998 | Tagami et al. | |
| 6,004,016 A | 12/1999 | Spector | |
| 6,236,737 B1 | 5/2001 | Gregson et al. | |
| 6,331,181 B1 | 12/2001 | Tierney et al. | |
| 6,341,246 B1 | 1/2002 | Gerstenberger et al. | |
| 6,424,885 B1 | 7/2002 | Niemeyer et al. | |
| 6,456,901 B1 | 9/2002 | Xi et al. | |
| 6,493,608 B1 | 12/2002 | Niemeyer | |
| 6,674,877 B1 | 1/2004 | Jojic et al. | |
| 6,699,177 B1 | 3/2004 | Wang et al. | |

(Continued)

FOREIGN PATENT DOCUMENTS

| | | |
|---|---|---|
| JP | 8-108383 | 4/1996 |
| JP | 10-097316 | 4/1998 |

(Continued)

OTHER PUBLICATIONS

PCT International Search Report and Written Opinion, PCT/US08/87657, Mar. 19, 2009, 8 pages.

(Continued)

*Primary Examiner* — Dalena Tran
*Assistant Examiner* — Harry Oh
(74) *Attorney, Agent, or Firm* — Fenwick & West LLP; Mark E. Duell (57) ABSTRACT

A system, method, and computer program product for avoiding collision of a body segment with other structures in an articulated system are described. According to one aspect, a collision function is determined for avoiding such collision. A distance between the body segment and one such structure is measured. A weighting matrix is generated based on the collision function and the distance, and used to determine a redirected motion for the body segment. The body segment is redirected based on the redirected motion to avoid colliding with the structure.

19 Claims, 8 Drawing Sheets

U.S. PATENT DOCUMENTS

| | | | |
|---|---|---|---|
| 6,708,142 B1 | 3/2004 | Baillot et al. | |
| 6,786,896 B1 | 9/2004 | Madhani et al. | |
| 6,853,964 B1 * | 2/2005 | Rockwood et al. | 703/2 |
| 6,985,620 B2 | 1/2006 | Sawhney et al. | |
| 7,274,800 B2 | 9/2007 | Nefian et al. | |
| 7,292,151 B2 | 11/2007 | Ferguson et al. | |
| 7,457,733 B2 | 11/2008 | Maille et al. | |
| 7,688,016 B2 | 3/2010 | Aghili | |
| 7,859,540 B2 * | 12/2010 | Dariush | 345/474 |
| 8,170,287 B2 * | 5/2012 | Dariush et al. | 382/106 |
| 2003/0113018 A1 | 6/2003 | Nefian et al. | |
| 2004/0193413 A1 | 9/2004 | Wilson et al. | |
| 2005/0001842 A1 | 1/2005 | Park et al. | |
| 2005/0043718 A1 | 2/2005 | Madhani et al. | |
| 2005/0209534 A1 | 9/2005 | Dariush | |
| 2005/0271279 A1 | 12/2005 | Fujimura et al. | |
| 2006/0269145 A1 | 11/2006 | Roberts | |
| 2006/0293792 A1 | 12/2006 | Hasegawa et al. | |
| 2007/0013336 A1 | 1/2007 | Nowlin et al. | |
| 2007/0140562 A1 | 6/2007 | Linderman | |
| 2007/0162164 A1 * | 7/2007 | Dariush | 700/61 |
| 2007/0233280 A1 * | 10/2007 | Bacon et al. | 700/1 |
| 2007/0255454 A1 | 11/2007 | Dariush | |
| 2008/0019589 A1 | 1/2008 | Yoon et al. | |
| 2008/0181459 A1 | 7/2008 | Martin et al. | |
| 2008/0234864 A1 * | 9/2008 | Sugiura et al. | 700/255 |
| 2008/0317331 A1 | 12/2008 | Winn et al. | |
| 2010/0145521 A1 | 6/2010 | Prisco et al. | |

FOREIGN PATENT DOCUMENTS

| | | |
|---|---|---|
| WO | WO 2007/076118 A2 | 7/2007 |

OTHER PUBLICATIONS

PCT International Search Report and Written Opinion, PCT/US08/81171, Jan. 5, 2009, 10 pages.

PCT International Search Report and Written Opinion, PCT/US08/81201, Jan. 5, 2009, 9 pages.

United States Patent and Trademark Office, Final Rejection, U.S. Appl. No. 12/317,369, Aug. 31, 2012, 21 pages.

Japanese Patent Office, Non-Final Office Action, Japanese Patent Application No. P2010-531282, Jun. 18, 2012, 6 pages. (with English translation).d.

Japanese Patent Office, Non-Final Office Action, Japanese Patent Application No. JP 2010-532163, Dec. 18, 2012, seven pages.

* cited by examiner

FIGURE 8A Minimum distance between left and right hand collision points for a dancing motion.

FIGURE 8B Left and right hand minimum distance: zoomed in between frames 460 and 520.

REAL-TIME SELF COLLISION AND OBSTACLE AVOIDANCE USING WEIGHTING MATRIX

RELATED APPLICATIONS

This application claims a benefit of, and priority under 35 USC §119(e) to, U.S. Provisional Patent Application No. 60/984,639, filed Nov. 1, 2007, the contents of which are herein incorporated by reference herein in their entirety.

This application is related to U.S. patent application No. 11/614,930, filed Dec. 21, 2006, titled "Reconstruction, Retargetting, Tracking, and Estimation of Motion for Articulated Systems", U.S. patent application No. 11/734,758, filed Apr. 12, 2007, titled "Control Of Robots From Human Motion Descriptors", and U.S. patent application Ser. No. 12/257,664, entitled "Real-Time Self Collision And Obstacle Avoidance," by Behzad Dariush, Youding Zhu, and Kikuo Fujimura, filed concurrently with this application, all of which are incorporated by reference herein in their entirety.

BACKGROUND

1. Field of Disclosure

The disclosure generally relates to the field of controlling motion of a system, and more specifically, to controlling motion of a system to avoid collision.

2. Description of the Related Art

Collision avoidance has been an important and widely studied problem since the inception of robotics technology. The majority of early research in this area focused on obstacle avoidance, typically for applications involving mobile robot navigation and industrial manipulation. See A. A. Maciejewski and C. A. Klein, "Obstacle avoidance for kinematically redundant manipulators in dynamically varying environments", *International Journal of Robotics Research*, 4:109-117 (1985); see also 0. Khatib, "Real-Time Obstacle Avoidance for Manipulators and Mobile Robots", *The International Journal of Robotics Research (IJRR)*, 5(1):90-98 (1986), both of which are incorporated by reference herein in their entirety. In these applications, the workspace was often predefined, static, or slowly varying. Moreover, application developers typically adopted the philosophy of segregating the workspace of robots and people as a safety countermeasure to avoid collisions with people. Setting large collision distance thresholds could be tolerated for many of the early mobile navigation and industrial manipulation applications. The concept of artificial potential fields proved to be an effective approach for obstacle avoidance under such circumstances.

Today, the field of robotics is moving towards development of high degree of freedom, human-like, and personal robots, which are often designed to share a common workspace and physically interact with humans. Such robots are often highly redundant which fundamentally adds new capabilities (self-motion and subtask performance capability). However, increased redundancy has also added new challenges for constraining the internal motion to avoid joint limits and self collisions. With these challenges, researchers have become increasingly aware of the need for robust collision avoidance strategies to accommodate such applications.

In particular, self collision avoidance, which was largely overlooked or not required when obstacle avoidance strategies were first developed, has recently become an important topic of research. See H. Sugiura, M. Gienger, H. Janssen, and C. Goerick, "Real-time collision avoidance with whole body motion control for humanoid robots", *IEEE Int. Conf. on Intelligent Robots and Systems (IROS* 2007), (2007); see also O. Stasse, A. Escande, N. Mansard, S. Miossec, P. Evrard, and A. Kheddar, "Real-time (self)-collision avoidance task on a hrp-2 humanoid robot", *In Proceedings of ICRA*, pages 3200-3205, Pasadena Calif. (2008), both of which are incorporated by reference herein in their entirety. Self collision avoidance is especially challenging for humanoid robots performing humanlike tasks. The collision avoidance strategy must not only accommodate multiple colliding bodies simultaneously, but also tolerate smaller collision distances than those established for early obstacle avoidance algorithms. Furthermore, a self collision avoidance strategy should not significantly alter the reference or originally planned motion. This is particularly important in applications involving reproduction of robot motion from observed human motion, a problem often referred to as motion retargeting. See B. Dariush, M. Gienger, B. Jian, C. Goerick, and K. Fujimura, "Whole body humanoid control from human motion descriptors", Int. Conf. Robotics and Automation (ICRA), Pasadena, Calif. (2008); see also A. Nakazawa, S. Nakaoka, K. Ikeuchi, and K. Yokoi, "Imitating human dance motions through motion structure analysis", *Intl. Conference on Intelligent Robots and Systems (IROS)*, pages 2539-2544, Lausanne, Switzerland (2002), both of which are incorporated by reference herein in their entirety.

Hence, there is lacking, inter alia, a system and method for motion control of robots and other articulated rigid body systems to avoid self collisions and obstacles in real-time.

SUMMARY

Embodiments of the present invention provide a method (and corresponding system and computer program product) for avoiding collision of a body segment with other structures in an articulated system. According to one aspect, a collision function is determined for avoiding such collision. A distance between the body segment and one such structure is measured. A weighting matrix is generated based on the collision function and the distance, and used to determine a redirected motion for the body segment. The body segment is redirected based on the redirected motion to avoid colliding with the structure.

According to another aspect of the present invention, a joint limit gradient weighting matrix is generated to avoid collision between connected body segments, and a collision gradient weighting matrix is generated to avoid obstacles and collision between unconnected body segments. A weighting matrix is generated based on the two matrices, and used to determine redirected motions of body segments to avoid obstacles and collision among the body segments in the articulated system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings (figures). A brief description of the drawings is as follows:

Figure (FIG.) 1 is a block diagram illustrating a motion retargeting system for controlling a target system in accordance with one embodiment of the invention.

DETAILED DESCRIPTION

The present invention provides a motion retargeting system (and corresponding method and computer program product) for real-time motion control of robots and other articulated rigid body systems while avoiding self collisions and obstacles. Collisions are avoided by monitoring distances between collision pairs and redirecting body segments based on redirected motion determined using a weighting matrix and the monitored distances.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Motion Retargeting System

Figure 1:
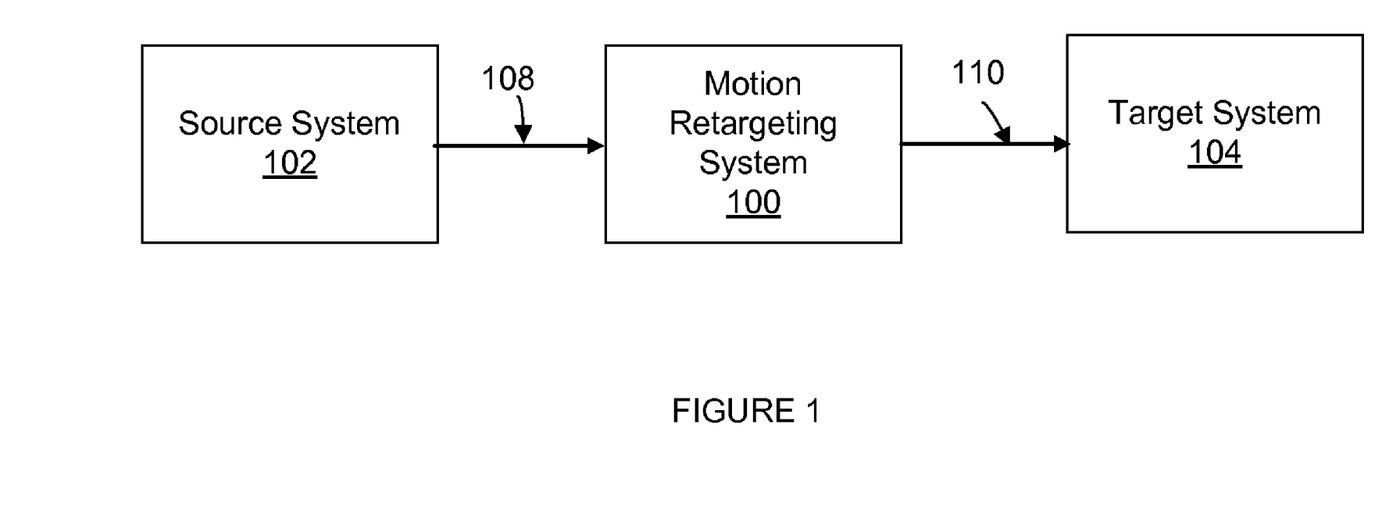

FIG. 1 is a block diagram illustrating a motion retargeting system 100 for controlling a target system 104, such as a robotic/bio-robotic system, to simulate motions tracked in a source system 102 in real time while avoiding self collisions and obstacles, according to one embodiment of the present invention. The motion retargeting system 100 (also known as motion planning system or motion filtering system) detects motion descriptors 108 of the source system 102. The source system 102 may be any motion generator, for example, a human or an animal. In response to the motion descriptors 108, the motion retargeting system 100 generates joint variables 110 for controlling the motion of the target system 104. The target system 104 may be, for example, a generic articulated system, such as a robot, an articulated mechanism (e.g., a humanoid robot), an avatar, or an exoskeleton apparatus for wearing by a human or animal.

In one embodiment, the motion retargeting system 100 captures motions generated in the source system 102 and transfers the captured motions to the target system 104, a process commonly referred to as motion retargeting. Motions in the source system 102 are tracked (e.g., by measuring marker positions, feature points) and expressed as motion descriptors 108 (also known as motion trajectories, desired task descriptors, task variables) using one or more motion primitives in Cartesian (or task) space. The motion descriptors 108 are converted to joint variables 110 (also known as joint space trajectories, joint motions, joint commands, joint motion descriptors) by the motion retargeting system 100. The motion retargeting system 100 uses the joint variables 110 to control the target system 104 to simulate the motion in the source system 102. The motion retargeting system 100 can impose constraints on motion in the target system 104 to avoid joint limits, muscular torque limits, self collisions, obstacles, and the like. For the sake of illustration, without loss of generality, the source system 102 represents a human model and the source motion represents human motion primitives which are typically observed or inferred from measurements, and the target system 104 represents a humanoid robot that is controlled to imitate the human model's motion. One of ordinary skill in the related arts would understand that the motion retargeting system 100 may be used for other purposes such as human pose estimation, tracking and estimation, and joint torque estimation in biomechanics.

Figure 2:
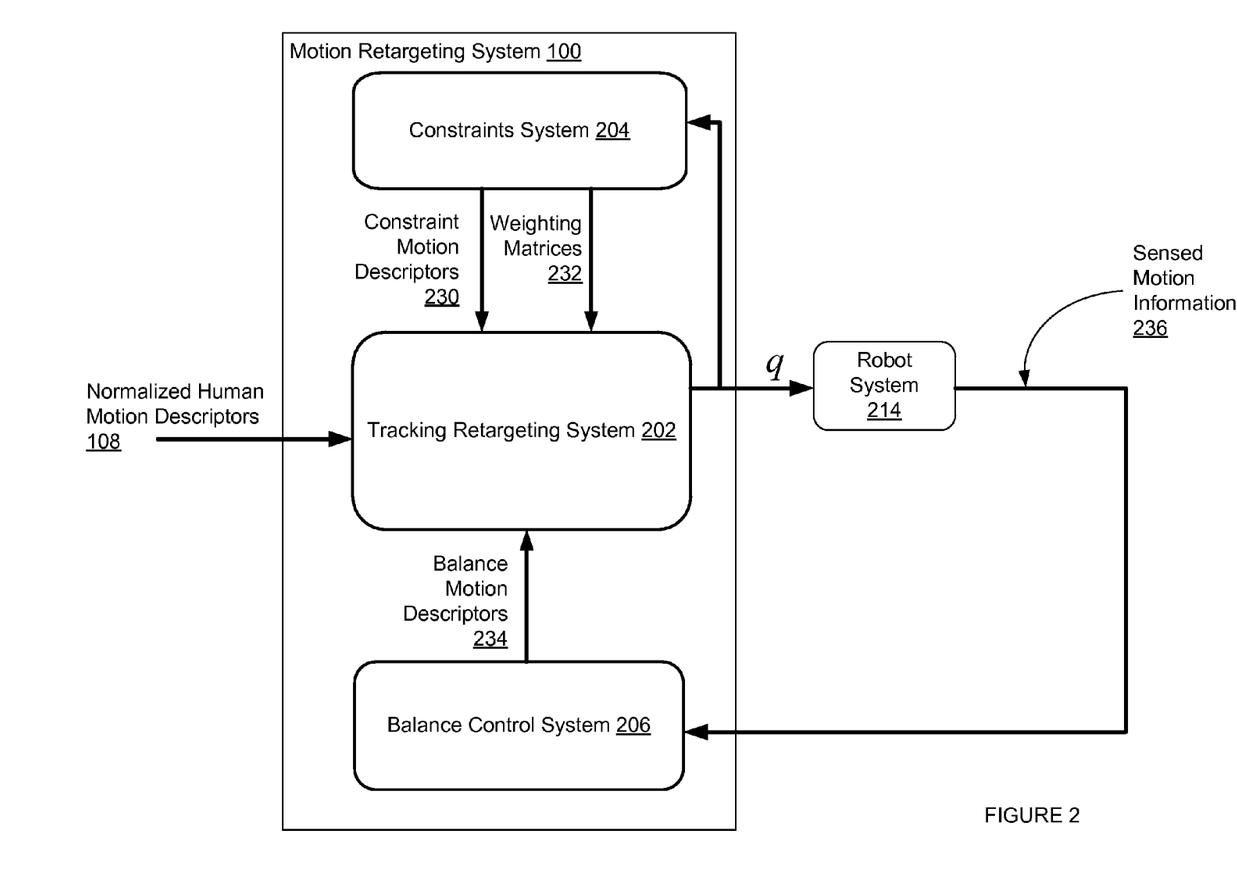
FIG. 2 is a block diagram illustrating a configuration of the motion retargeting system shown in FIG. 1 in accordance with one embodiment of the invention.

FIG. 2 is a block diagram illustrating a configuration of the motion retargeting system 100 for generating joint commands from observed motion descriptors 108 according to one embodiment. The motion retargeting system 100 generates a joint command q (the joint variables 110) for application to a robot system 214 (the target system 104) in response to the motion descriptors 108 extracted from observations of human motion in the source system 102 and previously generated joint commands. The motion retargeting system 100 comprises a tracking retargeting system 202, a constraints system 204, and a balance control system 206. The tracking retargeting system 202 generates the joint command q from the observed motion descriptors 108, constraint motion descriptors 230 and appropriate weighting matrices 232 from the constraints system 204, and balance motion descriptors 234 from the balance control system 206. The constraints system 204 generates the constraint motion descriptors 230 in response to the previously generated joint commands. The balanced control system 206 generates the balance motion descriptors 234 in response to the sensed motion information 236 from the robot system 214. It is noted that in other embodiments the motion retargeting system 100, the tracking retargeting system 202, and/or the constraints system 204 take the sensed motion information 236 from the robot system 214 as input, instead of or in addition to the previously generated joint commands. Similarly, the balanced control system 206 can take the previously generated joint commands as input, instead of or in addition to the sensed motion information 236 from the robot system 214.

In one embodiment, the motion retargeting system 100 uses a task space control framework to generate motion for all degrees of freedom in the target system 104 (in this case, the robot system 214) from a set of desired motion descriptors 108 which are observed from measurements (e.g., at feature points), synthesized, or computed from the current configuration of the target system 104. The tracking retargeting system 202 generates motion results in a set of computed joint commands which track the desired task descriptors, e.g., minimize the Cartesian tracking error. The balance control system 206 controls the resulting motion for balance and keeps the target system 104 stable. The constraint system 204 provides commands to prevent the target system 104 from violating the physical limits, such as joint limits, velocity limits, torque limits, and also works with the tracking retargeting system 202 to ensure the target system 104 avoids obstacles, self collisions, and computational problems arising from singularities. The three systems 202, 204 and 206 may present a large number of conflicting tasks which may be resolved through a hierarchical task management strategy. Further information of resolving conflicting tasks is found in U.S. application Ser. No. 11/734,758, filed Apr. 12, 2007, titled "Control Of Robots From Human Motion Descriptors", the content of which is incorporated by reference herein in its entirety. The precision of lower-priority (or lower level of importance) factors may be sacrificed at the expense of higher priority (or higher level of importance) factors.

The motion retargeting system 100, or any of its components described below, may be configured as software (e.g., modules that comprise instructions executable by a processor), hardware (e.g., an application specific integrated circuit), or a combination thereof. The software and/or hardware may operate in a computer system that is structured to include a processor, memory, computer-readable storage medium (e.g., hard drive), network interfaces, and applicable operating system and other functional software (e.g., network drivers, communication protocols).

Trajectory Conversion Process

The tracking retargeting system 202 converts the desired trajectories (the motion descriptors 108) from Cartesian space to joint space through a trajectory conversion process. The joint (or configuration) space refers to the set of all possible configurations of the target system 104. The Cartesian (or task) space refers to the space of the source system 102.

The number of robot degrees of freedom is denoted by n. These degrees of freedom which fully characterize the joint space is described by vector $q=[q_1, \ldots, q_n]^T$. One goal for the tracking retargeting system 202 is to generate collision-free joint motion based on reference motion described in the task space. For generality, suppose the task variables operate the full six dimensional task space, three for position and three for orientation. Also, suppose the number of task variables is k. Let i (i=1 . . . k) be the index of the spatial velocity vector $\dot{x}_i$ corresponding to the $i_{th}$ task descriptor. The associated Jacobian is given by $$J_i = \frac{\partial x_i}{\partial q}.$$

The mapping between the joint space velocities and the task space velocities is obtained by considering the differential kinematics relating the two spaces as follows $$\dot{x}_i = J_i(q)\dot{q}, \qquad (1)$$

where $J_i$ is the Jacobian of the task. The spatial velocity vector is defined by $$\dot{x}_i = [\omega_i \, \dot{p}_i]^T, \qquad (2)$$

where $\omega_i$ and $\dot{p}_i$ are vectors corresponding to the angular velocity of the task frame and the linear velocity of the task position referenced to the base frame, respectively. To augment all task variables, an augmented spatial velocity vector $\dot{x}_i$ and an augmented Jacobian matrix J are formed as follows, $$\dot{x} = [\dot{x}_1^T \ldots \dot{x}_i^T \ldots \dot{x}_k^T]^T, \qquad (3)$$

$$J = [J_1^T \ldots J_i^T \ldots J_k^T]^T. \qquad (4)$$

The Jacobian matrix may be decomposed to its rotational and translational components, denoted by $J_o$ and $J_p$, respectively, as follows, $$J = \begin{bmatrix} J_o \\ J_p \end{bmatrix}. \qquad (5)$$

If, for example, only a position descriptor $p_i$ is observable, then the parameters in Equation 1 can be modified to $\dot{x}_i = \dot{p}_i$, and $J_i = J_{p_i}$.

Closed Loop Inverse Kinematics

Closed loop inverse kinematics (CLIK) is an effective method to perform the trajectory conversion from task space to joint space. In one embodiment, the tracking retargeting system 202 utilizes a CLIK algorithm to perform the trajectory conversion. A detailed description about CLIK algorithms can be found in B. Dariush, M. Gienger, B. Jian, C. Goerick, and K. Fujimura, "Whole body humanoid control from human motion descriptors", *Int. Conf. Robotics and Automation*, (ICRA), Pasadena, Calif. (2008), the content of which is incorporated by reference herein in its entirety.

A CLIK algorithm uses a set of task descriptors as input and estimates the robot joint commands that minimize the tracking error between the reference Cartesian motion (the desired task descriptors) and predicted Cartesian motion.

In one embodiment, a control policy of the CLIK algorithm is configured to produce robot joint commands such that the Cartesian error between the predicted robot task descriptors and the reference task descriptors is minimized. The tracking performance is subject to the kinematic constraints of the robot system 214, as well as the execution of multiple and often conflicting task descriptor requirements. The formulation of such a constrained optimization is based on extensions of the CLIK formulation.

Let the velocity of the reference task descriptors in the task space be described by, $$\dot{x}_r = [\dot{x}_{r_1}^T \ldots \dot{x}_{r_i}^T \ldots \dot{x}_{r_k}^T]^T. \qquad (6)$$

The joint velocities may be computed by inverting Equation 1 and adding a feedback error term to correct for numerical drift.

$$\dot{q} = J^*(\dot{x}_r + K\,e), \qquad (7)$$

where J* denotes the regularized right pseudo-inverse of J weighted by a positive definite matrix W, $$J^* = W^{-1}J^T(JW^{-1}J^T + \lambda^2 I)^{-1}. \qquad (8)$$

The parameter $\lambda > 0$ is a damping term, and I is an identity matrix. If $\lambda^2 I = 0$, then Equation 8 is simply the weighted right pseudo-inverse of J. Furthermore, if J is a square non-singular matrix, W is the identity matrix, and $\lambda^2 I = 0$, the matrix J* is replaced by the standard matrix inversion $J^{-1}$.

The vector $\dot{x}_{r_i} = [\omega_{r_i} \, \dot{p}_{r_i}]^T$ corresponds to the differential kinematics of the reference motion, where $\omega_{r_i}$ and $\dot{p}_{r_i}$ are the angular velocity and linear velocity of the reference task descriptors. The rate of convergence of the error for the $i_{th}$ descriptor is controlled by $K_i$, a diagonal 6×6 positive definite gain matrix. The vector e is the concatenation of the individual error terms $e_i = [e_{o_i} \, e_{p_i}]^T$, where $e_{p_i}$ and $e_{o_i}$ are the position and orientation error vectors between the reference and computed task descriptors. Further information about the tracking errors are found in Dariush, "Whole body humanoid control from human motion descriptors"; J. Y. S. Luh, M. W. Walker, and R. P. C. Paul, "Resolved-acceleration control of mechanical manipulators", *IEEE Transactions on Automatic Control*, 25:468-474 (1980); F. Chiaverini, B. Siciliano, and O. Egeland, "Review of damped least squares inverse kinematics with experiments on an industrial robot manipulator",

*IEEE Trans. Control Systems Tech.*, 2(2):123-134 (1994), the contents of which are incorporated by reference herein in their entirety.

Figure 3:
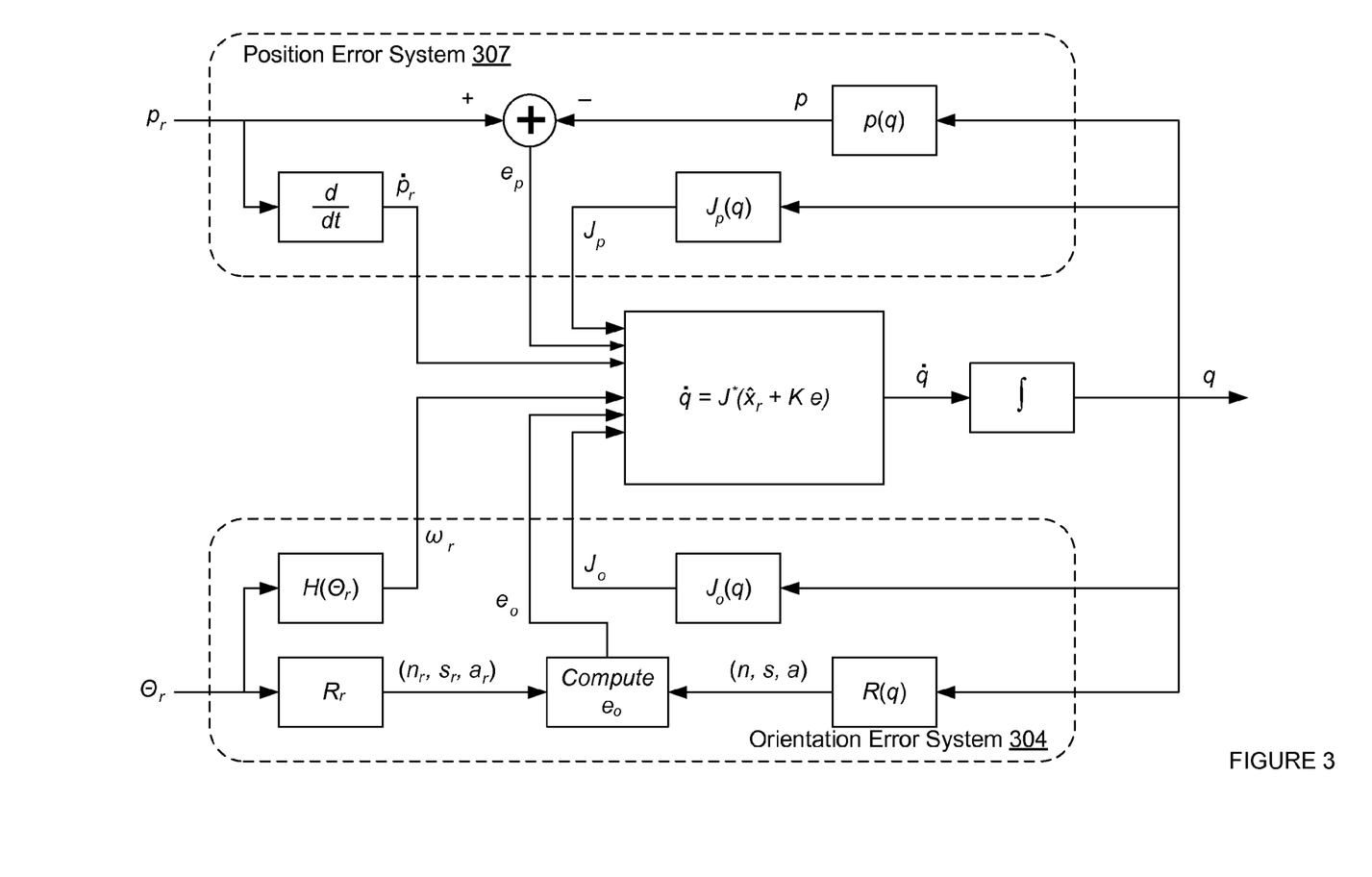
FIG. 3 is a flow diagram illustrating a tracking retargeting process in accordance with one embodiment of the invention.

FIG. 3 is a flow diagram illustrating a tracking retargeting process based on the CLIK algorithm. In one embodiment, the process is implemented in the tracking retargeting system 202, such that it can use the CLIK algorithm to track the position and orientation of the observed motion descriptors 108. As shown, the tracking retargeting system 202 generates a joint command (q) for following a time varying desired position ($p_r$) and orientation ($\Theta_r$) of the task descriptors 108 in response to position errors generated by a position error system 307 and orientation errors generated by a orientation error system 304. In one embodiment, the tracking retargeting system 202 uses Equation 7 as the control law to generate the joint command for the robot system 214.

Further information and additional embodiments of the tracking retargeting system 202 are found in B. Dariush, M. Gienger, A. Arumbakkam, Y. Zhu, K. Fujimura, and C. Goerick, "Online Transfer of Human Motion to Humanoids", *International Journal of Humanoid Robotics* (Oct. 6, 2008), and U.S. application Ser. No. 11/734,758, filed Apr. 12, 2007, titled "Control Of Robots From Human Motion Descriptors", the contents of both are incorporated by reference herein in its entirety.

Collision Avoidance

Collision avoidance of a target system 104 with itself or with other obstacles allows the target system 104 to safely execute a motion. Collision avoidance may be categorized as self-collision avoidance or obstacle avoidance. Self collision avoidance refers to a situation where two segments of the robot system 214 come into contact; whereas obstacle avoidance refers to the situation where the robot system 214 comes into contact with an object in the environment. Self collision avoidance may be further categorized as avoidance of self collision between connected body segment pairs and avoidance of self collision between unconnected body segment pairs. By connected segment pairs, it is implied that the two segments are connected at a common joint and assumed that the joint is rotational. In the case of obstacle avoidance, the two colliding bodies are always unconnected.

An approach to avoid self collisions and obstacles is described in detail below. The approach can be implemented in the CLIK formulation of the tracking retargeting system 202. Avoidance of self collision between connected body segment pairs are described first, followed by avoidance of collision between unconnected bodies. A unified approach to avoid self collisions and obstacles are developed utilizing the algorithms. It is noted that the approach for avoidance of collision between unconnected bodies can be used to avoid both self collision between unconnected body segment pairs and collision with obstacles since both involves a segment of the robot system 214 comes into contact with an unconnected body.

Avoidance of Self Collision Between Two Connected Bodies

If two segment pairs are connected at a common rotational joint, i.e. connected segment pairs, self collision avoidance between the segment pairs may be handled by limiting the joint range. Joint limits for self collision avoidance need not correspond to the physical joint limits; rather, they may be more conservative virtual joint limits whose values are obtained by manually verifying the bounds at which collision does not occur. Therefore, collision avoidance between segment pairs can be achieved by limiting the joint range.

In one embodiment, avoidance of self collision between connected body segments and joint limit avoidance are achieved by the proper selection of the weighting matrix W in Equation 8. One example weighting matrix is defined by the Weighted Least-Norm (WLN) solution. The WLN solution was originally proposed by T. F. Chan and R. V. Dubey, "A weighted least-norm solution based scheme for avoiding joint limits for redundant joint manipulators", IEEE Transactions on Robotics and Automation, 11(2), (1995), the content of which is incorporated by reference herein in its entirety. A WLN solution is formulated in the context of Damped Least Squares Jacobian inverse. The WLN solution is utilized to generate an appropriate weighting matrix based on the gradient of a joint limit function to dampen joints nearing their limits. This solution is described below.

A candidate joint limit function that has higher values when the joints near their limits and tends to infinity at the joint limits is denoted by H(q). One such candidate function proposed by Zghal et al. is given by $$H(q) = \frac{1}{4}\sum_{i=1}^{n} \frac{(q_{i,\max} - q_{i,\min})^2}{(q_{i,\max} - q_i)(q_i - q_{i,\min})}, \quad (9)$$

where $q_i$ represents the generalized coordinates of the $i_{th}$ degree of freedom, and $q_{i,min}$ and $q_{i,max}$ are the lower and upper joint limits, respectively. See H. Zghal and R. V. Dubey, "Efficient gradient projection optimization for manipulators with multiple degrees of redundancy", *Int. Conf. Robotics and Automation*, volume 2, pages 1006-1011 (1990), the content of which is incorporated by reference herein in its entirety. The upper and lower joint limits represent the more conservative limits between the physical joint limits and the virtual joint limits used for collision avoidance. Note that H(q) is normalized to account for the variations in the range of motion. The gradient of H, denoted as $\nabla H$, represents the joint limit gradient function, an n×1 vector whose entries point in the direction of the fastest rate of increase of H.

$$\nabla H = \frac{\partial H}{\partial q} = \left[\frac{\partial H}{\partial q_1}, \ldots, \frac{\partial H}{\partial q_n}\right]. \quad (10)$$

The element associated with joint i is given by, $$\frac{\partial H(q)}{\partial q_i} = \frac{(q_{i,\max} - q_{i,\min})^2(2q_i - q_{i,\max} - q_{i,\min})}{4(q_{i,\max} - q_i)^2(q_i - q_{i,\min})^2}. \quad (11)$$

The gradient $$\frac{\partial H(q)}{\partial q_i}$$

is equal to zero if the joint is at the middle of its range and goes to infinity at either limit. The joint limit gradient weighting matrix, denoted by $W_{JL}$, is defined by the following n×n diagonal matrix with diagonal elements $w_{JLi}$ (i=1 . . . n):

$$W_{JL} = \begin{bmatrix} w_{JL1} & 0 & 0 & 0 \\ 0 & w_{JL2} & 0 & 0 \\ 0 & 0 & \ddots & 0 \\ 0 & 0 & 0 & w_{JLn} \end{bmatrix}. \quad (12)$$

The weighting matrix W in Equation 8 is constructed by $W_{JL}$ (e.g., $W=W_{JL}$). The diagonal elements $w_{JLi}$ are defined by:

$$w_{JLi} = \begin{cases} 1 + \left|\frac{\partial H}{\partial q_i}\right| & \text{if } \Delta|\partial H/\partial q_i| \geq 0 \\ 1 & \text{if } \Delta|\partial H/\partial q_i| < 0 \end{cases}. \quad (13)$$

The term $\Delta|\partial H/\partial q_i|$ represents the change in the magnitude of the joint limit gradient function. A positive value indicates the joint is moving toward its limit while a negative value indicates the joint is moving away from its limit. When a joint moves toward its limit, the associated weighting factor described by the first condition in Equation 13, becomes very large causing the motion to slow down. When the joint nearly reaches its limit, the weighting factor is near infinity and the corresponding joint virtually stops. If the joint is moving away from the limit, there is no need to restrict or penalize the motions. In this scenario, the second condition in Equation 13 allows the joint to move freely. Therefore, $W_{JL}$ can be used for joint limit avoidance.

Avoidance of Collision Between Unconnected Bodies

One embodiment of a collision avoidance strategy for unconnected bodies is described below. Avoidance of self collision between unconnected body segment pairs is discussed first, followed by avoidance with obstacles.

For segment pairs of the robot system 214 that do not share the same joint, the collision avoidance strategy takes the minimum Euclidian distance (shortest distance) between the two colliding bodies as an input. The minimum distance between two bodies is denoted by d ($d \geq 0$). The coordinates of the minimum distance d between the two bodies are denoted by $p_a$ and $p_b$, referring to the base frame of the joint space. The two points, represented by a and b, are referred to as collision points (or collision point pairs). P(q, d) represents a candidate collision function that has a maximum value at d=0 and decays exponentially toward zero as d increases. In other embodiments, the candidate collision function can have a minimum value at d=0 and can increase as the distance d increases, e.g., the increase can be exponential.

The gradient of P, denoted as $\nabla P$, is the collision gradient function, an n×1 vector whose entries point in the direction of the fastest rate of increase of P.

$$\nabla P = \frac{\partial P}{\partial q} = \left[\frac{\partial P}{\partial q_1}, \ldots, \frac{\partial P}{\partial q_n}\right]. \quad (14)$$

The elements of the collision gradient function $\nabla P$ represent the degree to which each degree of freedom influences the distance to collision. The collision gradient function can be computed as follows $$\frac{\partial P}{\partial q} = \frac{\partial P}{\partial d}\frac{\partial d}{\partial q}. \quad (15)$$

Figure 4:
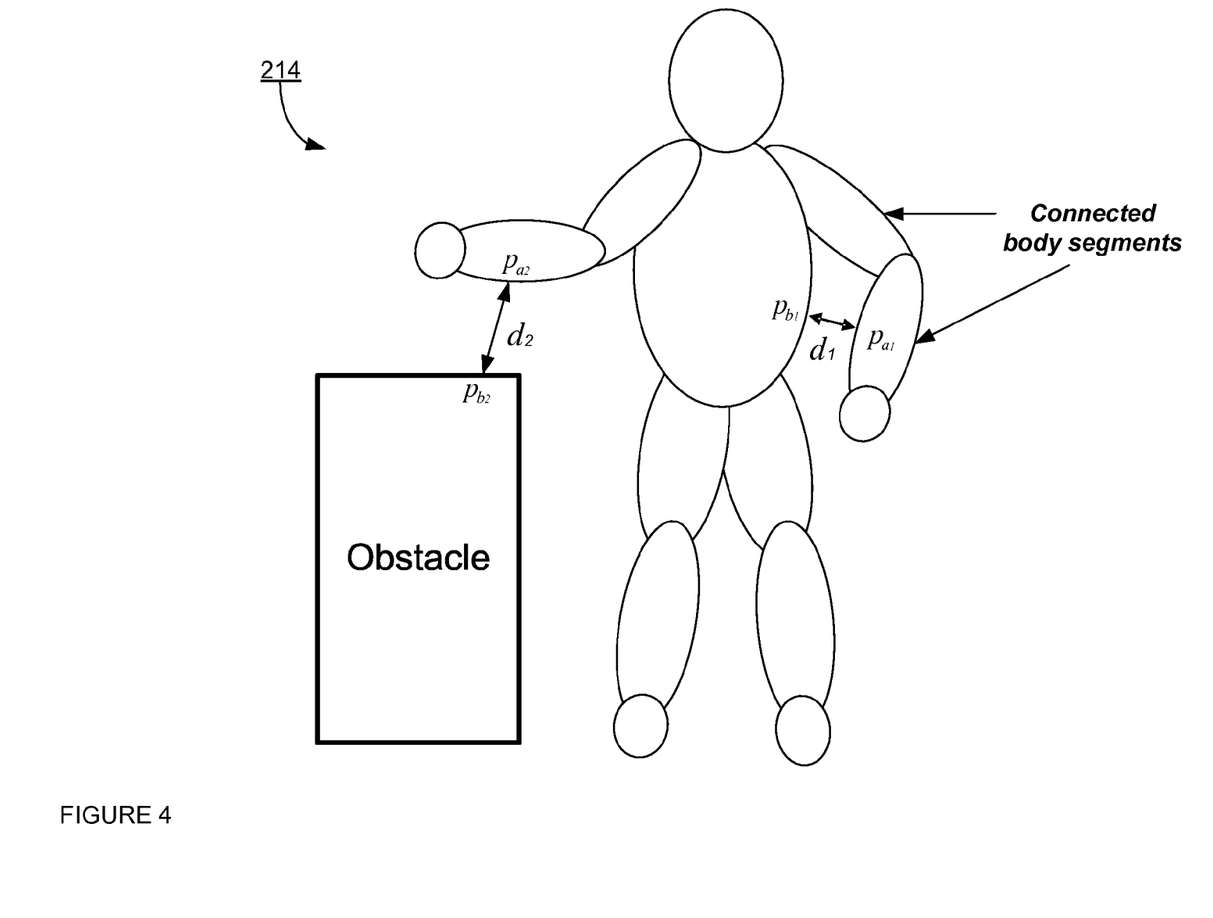
FIG. 4 is a diagram illustrating a robot system in accordance with one embodiment of the invention.

Consider first the case of self collision, or collision between two bodies of the robot system 214. In this scenario, it can be shown that the second term in Equation 15 is, $$\frac{\partial d}{\partial q} = \frac{1}{d}[J_a^T(p_a - p_b) + J_b^T(p_b - p_a)]^T, \quad (16)$$

where $p_a$ and $p_b$ represent the coordinates, referred to the base, of the two collision points, and $J_a$ and $J_b$ are the associated Jacobian matrices. The coordinates $p_a$ and $p_b$ can be obtained using a standard collision detection software. FIG. 4 is a diagram illustrating an example robot system 214. As shown, the robot system has a set of collision points (a1 and b1) between the forearm and trunk of the robot system 214.

If one of the collision point pairs, for example point b, represents a point on an environment obstacle that is not attached to the robot system 214 (e.g., a2 and b2 in FIG. 4), then Equation 16 simplifies to, $$\frac{\partial d}{\partial q} = \frac{1}{d}[J_a^T(p_a - p_b)]^T. \quad (17)$$

As noted above, the elements of the collision gradient function $\nabla P$ in Equation 14 represent the degree to which each degree of freedom influences the distance to collision. Therefore, it is desirable to select a collision function P(q), such that the gradient $\partial P(q)/\partial q_i$ is zero when d is large and infinity when d approaches zero. The collision gradient weighting matrix, denoted by $W_{COL}$, is defined by an n×n diagonal matrix with diagonal elements $w_{col_i}$ (i=1 . . . n) as follows, $$W_{COL} = \begin{bmatrix} w_{col_1} & 0 & 0 & 0 \\ 0 & w_{col_2} & 0 & 0 \\ 0 & 0 & \ddots & 0 \\ 0 & 0 & 0 & w_{col_n} \end{bmatrix}. \quad (18)$$

The scalars $w_{col_i}$ are defined by, $$w_{COL_i} = \begin{cases} 1 + \left|\frac{\partial P}{\partial q_i}\right| & \text{if } \Delta|\partial P/\partial q_i| \geq 0 \\ 1 & \text{if } \Delta|\partial P/\partial q_i| < 0 \end{cases}. \quad (19)$$

The collision function P can have different forms. For example, the following is a candidate collision function P according to one embodiment, $$P = \rho e^{-\alpha d} d^{-\beta}. \quad (20)$$

This candidate collision function is at infinity when d=0 and decays exponentially as d increases. The rate of decay is controlled by adjusting the parameters $\alpha$ and $\beta$. By increasing $\alpha$, the exponential rate of decay can be adjusted so that the function approaches zero more quickly. Likewise, increasing $\beta$ results in a faster rate of decay. The parameter $\rho$ controls the amplitude. The partial derivative of P with respect to q is, $$\frac{\partial P(q)}{\partial d} = -\rho e^{-\alpha d} d^{-\beta}(\beta d^{-1} + \alpha). \quad (21)$$

The quantity $$\frac{\partial P}{\partial q}$$

in Equation 15 can be analytically computed from Equation 16 (or Equation 17) and Equation 21.

Unified Collision Avoidance Approach

As described above, collision between connected body segment pairs can be avoided by applying a joint limit gradient weighting matrix $W_{JL}$, and collision between unconnected bodies can be avoided though a collision gradient weighting matrix $W_{COL}$. A weighting matrix W can be constructed to incorporate both matrices and avoid self collision between connected or unconnected segment pairs and collision with obstacles. It is assumed that $W_{JL}$ may be designed to enforce the physical joint limits as well as the virtual joint limits for collision avoidance of two connected bodies.

The basic concept of the unified approach is to design an appropriate weighting matrix W as in Equation 8 to penalize and dampen joints whose motion directs the segments toward collision. The weighting matrix is a diagonal matrix whose elements are derived by considering the gradients of the joint limit and collision potential functions. This strategy is also referred to as the joint limit and collision gradient weighting (JLCGW) matrix method for collision avoidance. The JLCGW matrix W is influenced by the n×n matrix $W_{JL}$ and the n×n matrix $W_{COL}$ For example, W can be defined as simple as the following, $$W = (W_{JL} + W_{COL})/2. \quad (22)$$

Alternatively, suppose a total of $N_c$ body pairs (connected body segment pairs, unconnected body segment pairs, body segment and obstacle pairs) are checked for collision. Let j (j=1 ... $N_c$) be the index of the $j_{th}$ collision pair, and $d_j$ the minimum distance between the two colliding bodies. Let $p_{a_j}$ and $p_{b_j}$ represent the coordinates, referred to the base frame of the joint space, of the two colliding points for the $j_{th}$ collision pair. The candidate potential function for each collision pair is given by, $$P_j = \rho e^{-\alpha_j d_j} d_j^{-\beta_j}. \quad (23)$$

The collision gradient weighting matrix is given by, $$W_{COL} = \sum_{j=1}^{N_c} \begin{bmatrix} w_{col_{j1}} & 0 & 0 & 0 \\ 0 & w_{col_{j2}} & 0 & 0 \\ 0 & 0 & \ddots & 0 \\ 0 & 0 & 0 & w_{col_{jn}} \end{bmatrix}. \quad (24)$$

The scalars $w_{col_{ji}}$ (i=1...n) are defined by, $$w_{COL_{ji}} = \begin{cases} 1 + \left|\frac{\partial P_j}{\partial q_i}\right| & \text{if } \Delta|\partial P_j/\partial q_i| \geq 0 \\ 1 & \text{if } \Delta|\partial P_j/\partial q_i| < 0 \end{cases}. \quad (25)$$

The weighting matrix W is described by, $$W = (W_{JL} + W_{COL})/(N_c + 1) \quad (26)$$

where the denominator normalizes the solution by the total number of collision pairs $N_c$ in addition to the effect of the joint limit avoidance, thus $N_c+1$.

Process for Collision Avoidance

Figure 5:
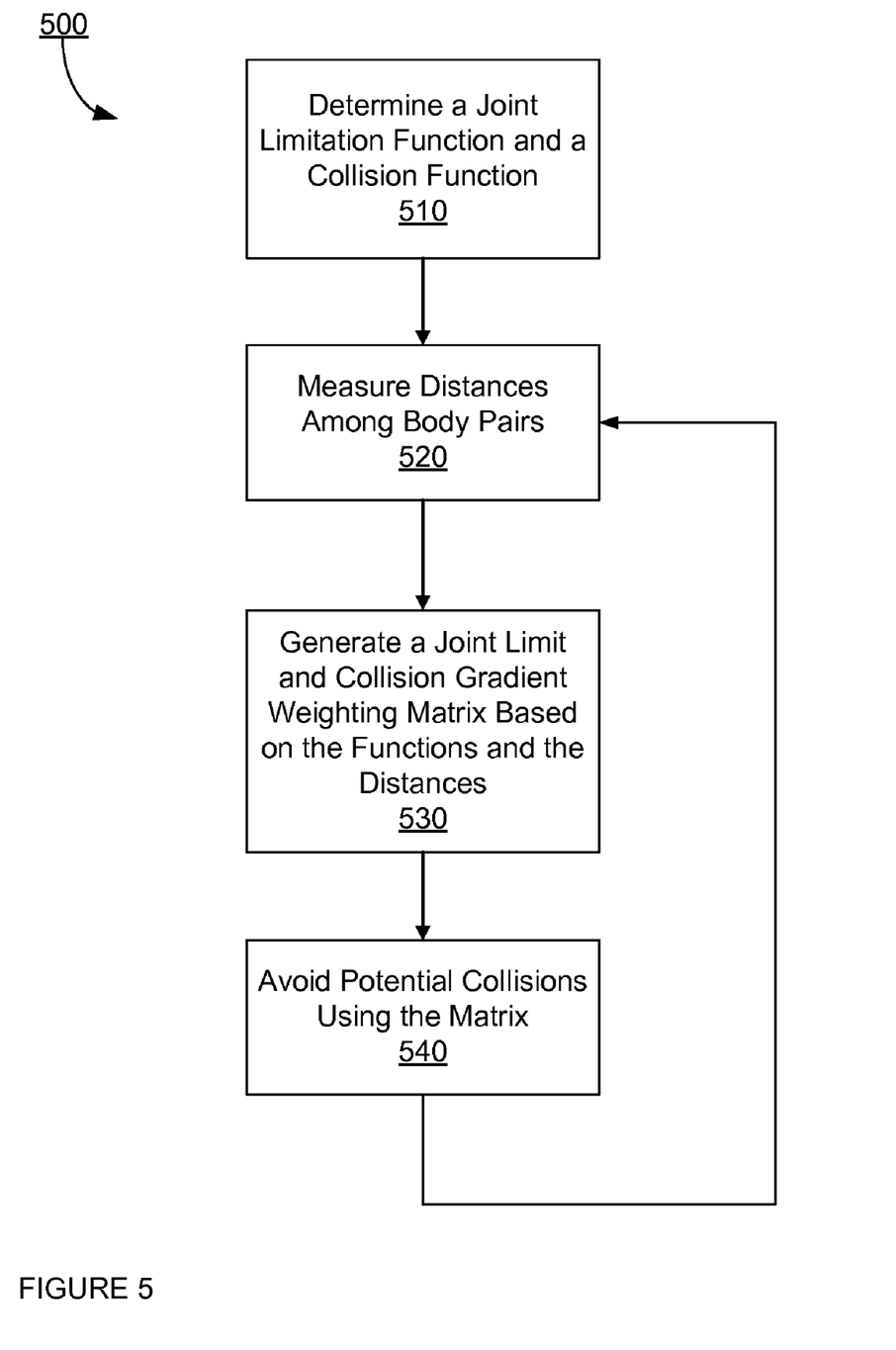
FIG. 5 is a flowchart illustrating an example process for preventing collisions between body pairs in accordance with one embodiment of the invention.

FIG. 5 is a flowchart illustrating an example process 500 for preventing collisions between body pairs utilizing the above algorithm according to one embodiment of the present invention. The process 500 can be executed or otherwise performed by, for example, the CLIK trajectory conversion system 308 to avoid collision in the robot system 214 as illustrated in FIG. 3.

One or more portions of the process 500 may be implemented in embodiments of hardware and/or software or combinations thereof. For example, the process 500 may be embodied through instructions for performing the actions described herein and such instrumentations can be stored within a tangible computer readable medium (e.g., flash memory, hard drive), and are executable by a computer processor. Furthermore, one of ordinary skill in the related arts would understand that other embodiments can perform the steps of the process 500 in different order. Moreover, other embodiments can include different and/or additional steps than the ones described here. The CLIK trajectory conversion system 308 can perform multiple instances of the steps of the process 500 concurrently and/or in parallel.

The CLIK trajectory conversion system 308 controls motion of the robot system 214 based on motion descriptors received from a source system 102. The CLIK trajectory conversion system 308 determines 510 a joint limitation function for avoiding collisions between connected body segment pairs and a collision function for avoiding obstacles and collisions between unconnected body segment pairs. An example of the joint limitation function is shown in Equation 9. An example of the collision gradient function is shown in Equation 20.

The CLIK trajectory conversion system 308 measures 520 distances between body pairs that can potentially collide into each other. Such body pairs include connected body segment pairs, unconnected body segment pairs, and body segment and obstacle pairs. In one embodiment, the CLIK trajectory conversion system 308 maintains a distance table listing the distances between the collision pairs, measures 520 their distances through sensors in real time, and updates the distance table accordingly.

The CLIK trajectory conversion system 308 generates 530 a joint limit and collision gradient weighting (JLCGW) matrix based on the joint limitation function, the collision function, and the measured distances. Example processes for generating 530 the JLCGW matrix are disclosed above with relation to Equations 22 and 26.

The CLIK trajectory conversion system 308 avoids 540 potential collisions by using the JLCGW matrix. In one embodiment, the JLCGW matrix is used as a weighting matrix in a CLIK algorithm used by the CLIK trajectory conversion system 308 to redirect the movements of the body segments in the robot system 214 to avoid collisions, as illustrated in Equation 8 above. Thereafter, the CLIK trajectory conversion system 308 continues measuring 520 the distances between the redirected collision pairs to prevent future collisions.

EXAMPLES

Figure 6:
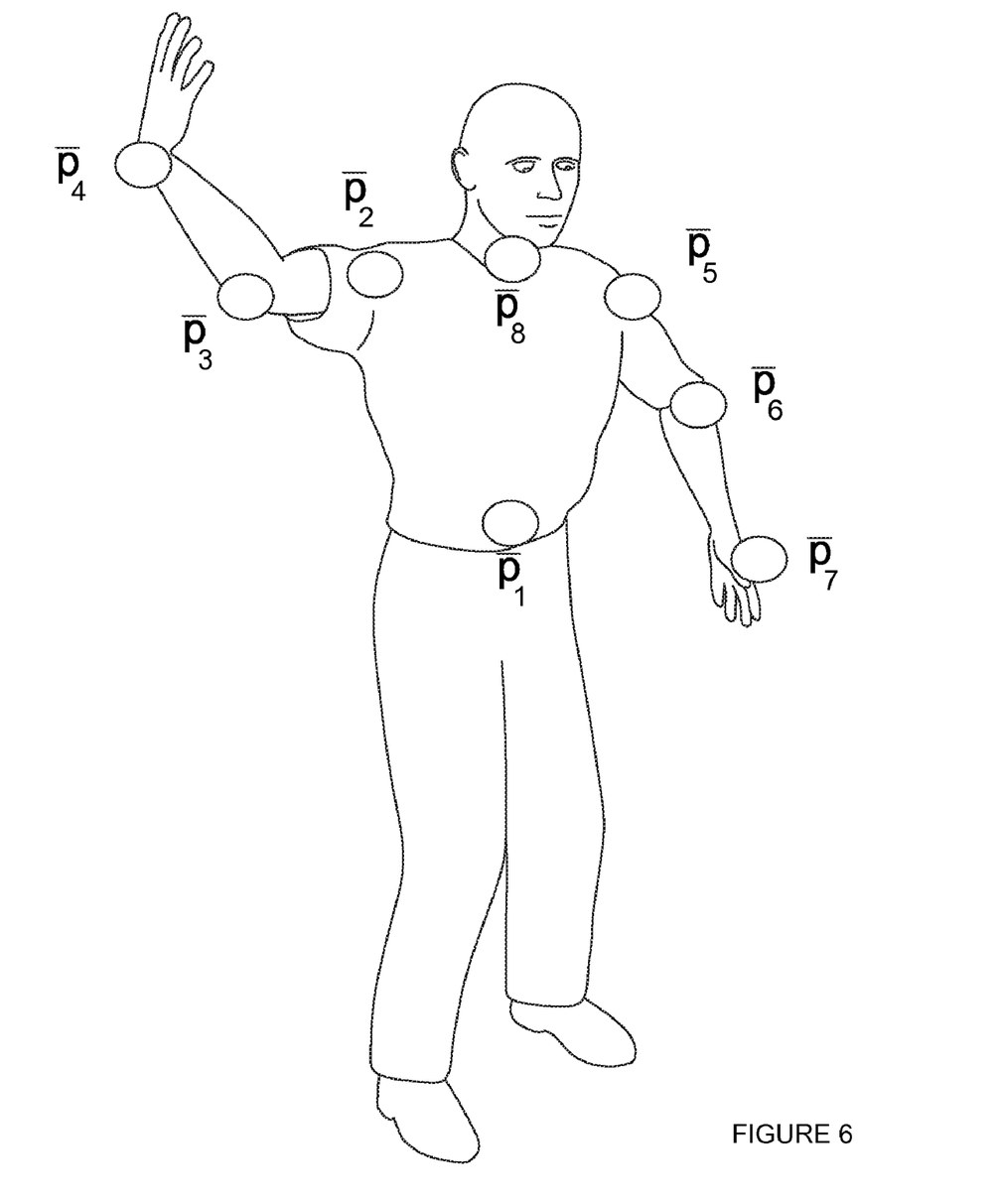
FIG. 6 is a diagram illustrating a human model in accordance with one embodiment of the invention.

One embodiment of the disclosed collision avoidance strategy is tested in a human-to-robot motion retargeting application. A set of desired upper body human motion descriptors are associated with a human model. The human motion descriptors consist of up to eight upper body Cartesian positions corresponding to a waist joint, two shoulder joints, two elbow joints, two wrist joints, and a neck joint. FIG. 6 is a diagram illustrating such a human model.

The human motion data was low pass filtered, interpolated, and scaled to the dimensions of ASIMO, a humanoid robot created by Honda Motor Company. The resulting motion corresponds to the reference robot motion descriptors used as input in the CLIK trajectory conversion system 308 which produces collision free robot joint motion.

Figure 7A:
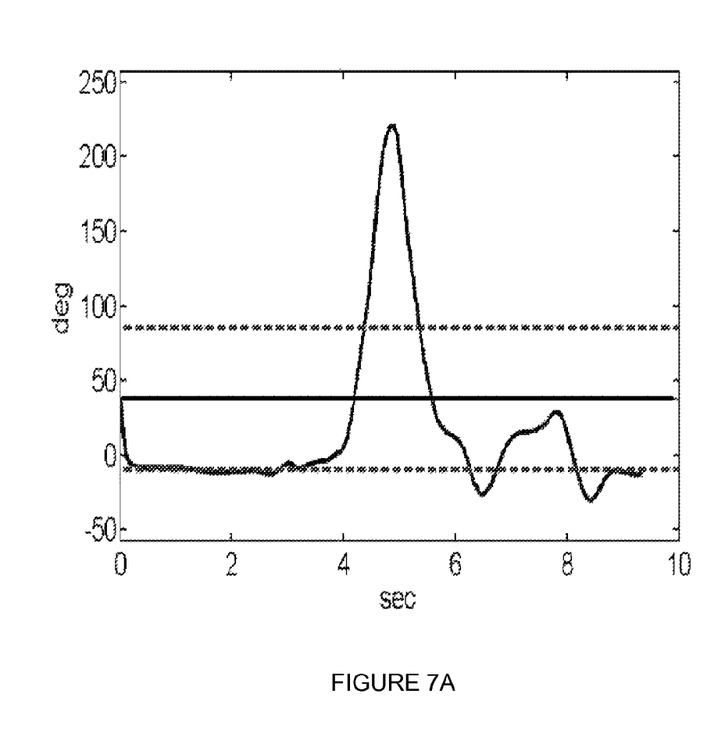
FIGS. 7A-B and 8A-B are diagrams showing a result of a collision avoidance strategy in preventing self collisions of body segments in accordance with one embodiment of the invention.
Figure 7B:
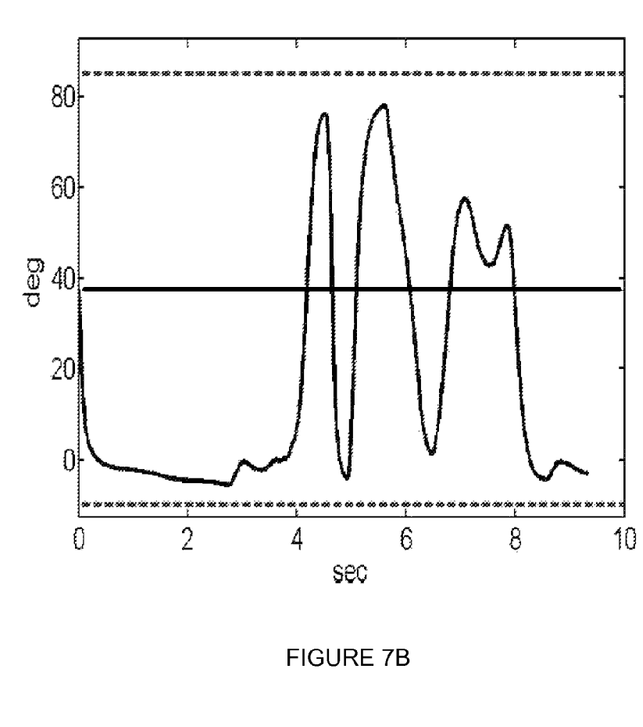

FIGS. 7A and 7B are diagrams showing the result of the collision avoidance strategy in preventing self collisions of connected body segments. FIG. 7A shows the 2nd Euler rotation (Adduction/Abduction) of the left shoulder joint when joint limit avoidance is not used. FIG. 7B shows the results after enforcing joint limits. The upper and lower joint limits are shown by dashed lines. If joint limit avoidance is not used, the shoulder joint rotates rapidly well beyond its limit, resulting in collision between the arm and the torso. With joint limit avoidance, the joint angle dampens gradually when it approaches its limits, creating a very smooth and natural looking motion.

Figure 8A:
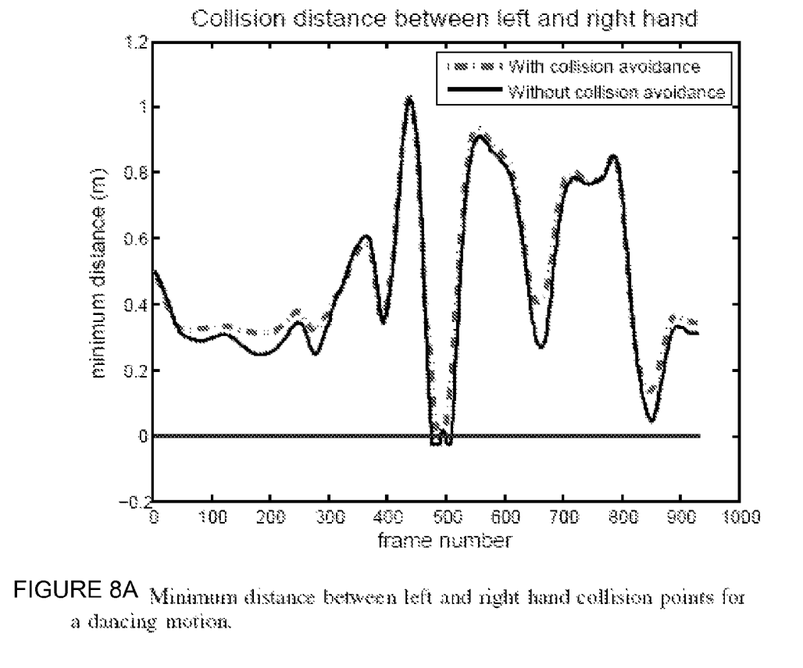
Figure 8B:
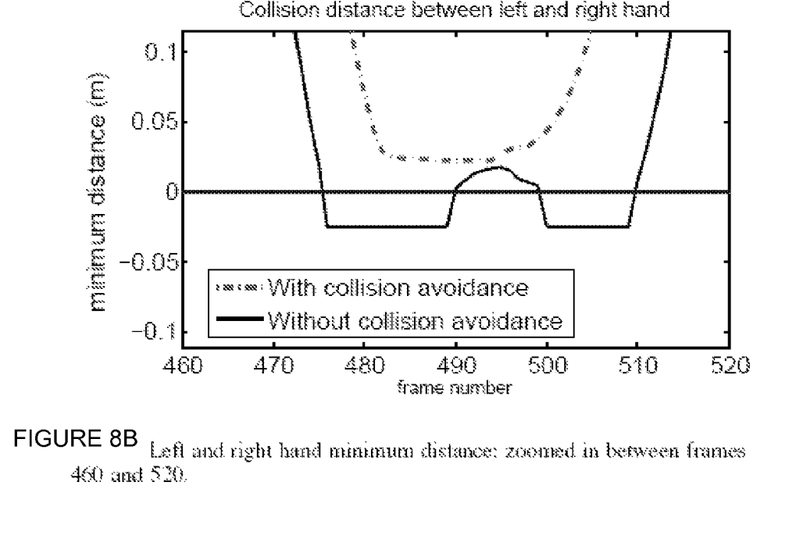

FIGS. 8A and 8B are diagrams showing the result of the collision avoidance strategy in preventing self collision of unconnected body segments. The diagrams show the minimum distance between collision points on the left hand and torso segment pairs. The minimum distances generated without using the collision avoidance algorithm are plotted using solid line. The minimum distances generated using the collision avoidance algorithm are plotted using dashed line. As shown, without collision avoidance, the collision points attached to the left hand and torso segment collide between frames 470 and 505 as shown in more detail in FIG. 8B. Note that a negative distance implies collision and penetration of the two bodies. When collision avoidance is turned on, contact between the two segments does not occur.

For further detail of the test, please refer to B. Dariush, M. Gienger, B. Jian, C. Goerick, and K. Fujimura, "Whole body humanoid control from human motion descriptors", *Int. Conf. Robotics and Automation (ICRA)*, Pasadena, Calif. (2008), the content of which is incorporated by reference herein in its entirety.

Alternate Embodiments

The above embodiments describe a motion retargeting system for real-time motion control of robot systems to avoid self collisions and obstacles in motion retargeting. One skilled in the art would understand that the motion retargeting system can be used to control other articulated rigid body systems, either in real environment or virtual environment (e.g., human figure animation), and for purpose other than motion retargeting (e.g., robotic motion generation and control, human pose estimation, tracking and estimation, and joint torque estimation in biomechanics).

Some portions of above description describe the embodiments in terms of algorithmic processes or operations, for example, the processes and operations as described with FIG. 6. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for real-time motion control of robots and other articulated rigid body systems to avoid self collisions and obstacles. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for avoiding collision of a body segment in an articulated system, the method comprising:
   determining a collision function for avoiding collision between the body segment and other structures in the articulated system;
   measuring a distance between the body segment and a first structure, the first structure being one of the other structures;
   determining a joint limit function for avoiding self collision between the body segment and the other structures in the articulated system;
   measuring a joint vector between the body segment and a second structure, the second structure being one of the other structures;

generating, using a processor, a collision gradient weighting matrix based on the collision function and the measured distance;

generating, using a processor, a joint limit gradient weighting matrix based on the joint limit function and the measured joint vector;

generating a combined weighting matrix based on the collision gradient weighting matrix and the joint limit gradient weighting matrix;

determining a redirected motion that prevents the body segment from colliding with the first structure based on the combined weighting matrix; and redirecting the body segment based on the redirected motion to avoid colliding with the first structure.

2. The method of claim 1, wherein the first structure is not directly connected with the body segment.

3. The method of claim 1, wherein the collision function comprises elements each representing a degree to which a corresponding degree of freedom influences the distance.

4. The method of claim 3, wherein the collision gradient weighting matrix comprises an n×n diagonal matrix with diagonal elements, the diagonal elements comprising elements of the collision function.

5. The method of claim 1, wherein the collision function has a maximum value when the distance equals zero and decays exponentially towards zero as the distance increases, and wherein the collision function has an adjustable parameter that affects a rate of decay.

6. The method of claim 1, wherein a value of the collision function varies depending upon the distance between the body segment and the first structure.

7. The method of claim 1, further comprising:
receiving a motion descriptor;
generating a joint variable based on the motion descriptor; and
controlling motion of the body segment toward a target based on the joint variable,
wherein determining the redirected motion comprises determining the redirected motion that directs the body segment towards the target while preventing the body segment from colliding with the first structure, and
wherein redirecting the body segment further comprises redirecting the body segment toward the target without colliding with the first structure.

8. The method of claim 7, wherein the motion descriptor describes a human motion, the articulated system comprises a humanoid robot, and the joint variable controls the humanoid robot to simulate the human motion.

9. The method of claim 1, wherein redirecting the body segment further comprises:
generating a redirected motion descriptor based on the redirected motion;
generating a redirected joint variable based on the redirected motion descriptor; and
redirecting the body segment based on the redirected joint variable to avoid colliding with the first structure.

10. The method of claim 1, wherein the combined weighting matrix is normalized by a total number of collision pairs in the articulated system.

11. The method of claim 1, wherein the redirected motion is calculated using a closed loop inverse kinematics (CLIK) algorithm.

12. A computer program product for avoiding collision of a body segment in an articulated system, the computer program product configured to be stored in a non-transitory computer-readable storage medium, the computer program product comprising executable computer program code for performing a method comprising:
determining a collision function for avoiding collision between the body segment and other structures in the articulated system;
measuring a distance between the body segment and a first structure, the first structure being one of the other structures;
determining a joint limit function for avoiding self collision between the body segment and the other structures in the articulated system;
measuring a joint vector between the body segment and a second structure, the second structure being one of the other structures;
generating, using a processor, a collision gradient weighting matrix based on the collision function and the measured distance;
generating, using a processor, a joint limit gradient weighting matrix based on the joint limit function and the measured joint vector;
generating a combined weighting matrix based on the collision gradient weighting matrix and the joint limit gradient weighting matrix;
determining a redirected motion that prevents the body segment from colliding with the first structure based on the combined weighting matrix; and
redirecting the body segment based on the redirected motion to avoid colliding with the first structure.

13. The computer program product of claim 12, wherein the collision function comprises elements each representing a degree to which a corresponding degree of freedom influences the distance.

14. The computer program product of claim 13, wherein the collision gradient weighting matrix comprises an n×n diagonal matrix with diagonal elements, the diagonal elements comprising elements of the collision function.

15. The computer program product of claim 12, wherein the method further comprises:
receiving a motion descriptor;
generating a joint variable based on the motion descriptor; and
controlling motion of the body segment toward a target based on the joint variable,
wherein determining the redirected motion comprises determining the redirected motion that directs the body segment towards the target while preventing the body segment from colliding with the first structure, and
wherein redirecting the body segment further comprises redirecting the body segment toward the target without colliding with the first structure.

16. A system for avoiding collision of a body segment in an articulated system, the system comprising:
a computer processor for executing executable computer program code;
a computer-readable storage medium containing the executable computer program code for performing a method comprising:
determining a collision function for avoiding collision between the body segment and other structures in the articulated system;
measuring a distance between the body segment and a first structure, the first structure being one of the other structures;
determining a joint limit function for avoiding self collision between the body segment and the other structures in the articulated system;

measuring a joint vector between the body segment and a second structure, the second structure being one of the other structures;

generating, using a processor, a collision gradient weighting matrix based on the collision function and the measured distance;

generating, using a processor, a joint limit gradient weighting matrix based on the joint limit function and the measured joint vector;

generating a combined weighting matrix based on the collision gradient weighting matrix and the joint limit gradient weighting matrix;

determining a redirected motion that prevents the body segment from colliding with the first structure based on the combined weighting matrix; and redirecting the body segment based on the redirected motion to avoid colliding with the first structure.

17. The system of claim 16, wherein the collision function comprises elements each representing a degree to which a corresponding degree of freedom influences the distance.

18. The system of claim 17, wherein the collision gradient weighting matrix comprises an n×n diagonal matrix with diagonal elements, the diagonal elements comprising elements of the collision function.

19. The system of claim 16, wherein the method further comprises:

receiving a motion descriptor;

generating a joint variable based on the motion descriptor; and controlling motion of the body segment toward a target based on the joint variable, wherein determining the redirected motion comprises determining the redirected motion that directs the body segment towards the target while preventing the body segment from colliding with the first structure, and wherein redirecting the body segment further comprises redirecting the body segment toward the target without colliding with the first structure.

* * * * *